US012510055B1

(12) United States Patent
Echemendia et al.

(10) Patent No.: US 12,510,055 B1
(45) Date of Patent: Dec. 30, 2025

(54) WIND TURBINE WITH A ROTATING TOWER

(71) Applicants: Abel Echemendia, Hypoluxo, FL (US); Abel Julian Echemendia, Jr., Hypoluxo, FL (US); Daniel S. Echemendia, Hypoluxo, FL (US)

(72) Inventors: Abel Echemendia, Hypoluxo, FL (US); Abel Julian Echemendia, Jr., Hypoluxo, FL (US); Daniel S. Echemendia, Hypoluxo, FL (US)

( * ) Notice: Subject to any disclaimer, the term of this patent is extended or adjusted under 35 U.S.C. 154(b) by 159 days.

(21) Appl. No.: 18/604,582

(22) Filed: Mar. 14, 2024

(51) Int. Cl.
*F03D 13/20* (2016.01)
*F03D 13/10* (2016.01)
*F03D 80/70* (2016.01)

(52) U.S. Cl.
CPC .......... *F03D 13/201* (2023.08); *F03D 13/112* (2023.08); *F03D 80/70* (2016.05)

(58) Field of Classification Search
CPC .......... F03D 3/005; F03D 7/06; F03D 13/112; F03D 13/20; F03D 13/2005; F03D 13/201; F03D 13/22; F03D 80/70; Y02E 10/72; Y02E 10/74; E02D 27/42; E02D 27/425
See application file for complete search history.

(56) References Cited

U.S. PATENT DOCUMENTS

| 206,631 A | * | 7/1878 | Smith | F03D 1/065 |
| | | | | 416/132 B |
| 4,302,684 A | * | 11/1981 | Gogins | E01B 25/00 |
| | | | | 505/879 |
| 4,456,429 A | * | 6/1984 | Kelland | F03D 3/062 |
| | | | | 416/DIG. 8 |
| 4,832,569 A | * | 5/1989 | Samuelsen | F03D 3/068 |
| | | | | 416/17 |
| 6,379,115 B1 | * | 4/2002 | Hirai | F03D 3/068 |
| | | | | 416/37 |
| 6,448,668 B1 | * | 9/2002 | Robitaille | F03D 9/25 |
| | | | | 290/43 |
| 6,629,815 B2 | * | 10/2003 | Lusk | F03D 3/005 |
| | | | | 415/4.2 |
| 7,040,859 B2 | * | 5/2006 | Kane | F03D 9/10 |
| | | | | 415/4.4 |

(Continued)

FOREIGN PATENT DOCUMENTS

| CN | 107061179 A | * | 8/2017 |
| CN | 107091206 A | * | 8/2017 |

(Continued)

*Primary Examiner* — Ryan D Kwiecinski
(74) *Attorney, Agent, or Firm* — Donald J. Ersler

(57) ABSTRACT

A wind turbine with a rotating tower preferably includes a stationary base, a rotating tower, a plurality of motor systems, a nacelle and a blade assembly. The stationary base preferably includes a support ring, a support structure and a base bearing. The support ring includes a peripheral gear rack. The support structure supports support ring. The rotating tower preferably includes a tower body, a plurality of tower gussets and a bearing shaft. The plurality of motor systems are secured to the bottom of the plurality of tower gussets and the tower body. Each motor system preferably includes a drive motor unit and a plurality of support rollers. The support ring includes a cross-section, which is sized to be received by the plurality of support rollers. A drive gear of the drive motor unit rotates the rotating tower.

18 Claims, 7 Drawing Sheets

(56) References Cited

U.S. PATENT DOCUMENTS

| | | | | |
|---|---|---|---|---|
| 7,323,791 B2* | 1/2008 | Jonsson | F03D 3/062 | 290/55 |
| 7,385,302 B2* | 6/2008 | Jonsson | F03D 3/068 | 290/55 |
| 7,550,865 B2* | 6/2009 | Jonsson | F03D 3/068 | 290/55 |
| 8,257,018 B2* | 9/2012 | Coffey | F03D 3/005 | 415/4.4 |
| 9,051,916 B2* | 6/2015 | King | F03D 3/005 | |
| 9,644,604 B2* | 5/2017 | Whinney | F03D 7/06 | |
| 2008/0008575 A1* | 1/2008 | El-Sayed | F03D 3/062 | 415/8 |
| 2008/0042445 A1* | 2/2008 | Stephens | F03D 13/20 | 290/55 |
| 2010/0301613 A1* | 12/2010 | Oosterling | F03D 13/22 | 290/55 |
| 2011/0006536 A1* | 1/2011 | Liu | F03D 13/20 | 290/55 |
| 2011/0033291 A1* | 2/2011 | Moore | F03D 15/10 | 416/169 R |
| 2011/0215738 A1* | 9/2011 | Kamen | F03D 7/0236 | 290/44 |
| 2012/0091715 A1* | 4/2012 | Ozkul | F03D 3/005 | 290/44 |
| 2013/0170987 A1* | 7/2013 | Himmelmann | E04H 12/18 | 384/129 |
| 2013/0341934 A1* | 12/2013 | Kawanishi | F03D 9/007 | 290/55 |
| 2014/0252773 A1* | 9/2014 | Patel | F03D 80/70 | 290/55 |
| 2015/0069759 A1* | 3/2015 | Aranovich | F03D 3/005 | 415/60 |
| 2015/0267687 A1* | 9/2015 | Wendeberg | F16C 19/547 | 29/889.21 |
| 2016/0032899 A1* | 2/2016 | Fujiwara | F03D 80/70 | 416/169 R |
| 2016/0138567 A1* | 5/2016 | Loth | F03D 13/22 | 416/146 R |
| 2016/0298605 A1* | 10/2016 | Brendle | F03D 7/06 | |
| 2018/0051678 A1* | 2/2018 | Fierro | F16C 35/047 | |
| 2020/0191124 A1* | 6/2020 | Nunez Polo | F03D 80/70 | |
| 2022/0381224 A1* | 12/2022 | Ethiraj | F03D 3/068 | |
| 2023/0250804 A1* | 8/2023 | Farb | F03D 7/042 | |

FOREIGN PATENT DOCUMENTS

| | | | | |
|---|---|---|---|---|
| CN | 108301970 A | * | 7/2018 | F03D 80/70 |
| CN | 108678908 A | * | 10/2018 | F03D 7/0204 |
| CN | 112943551 A | * | 6/2021 | F03D 7/0204 |
| DE | 202013105408 U1 | * | 12/2013 | F03D 80/70 |
| GB | 2471847 A | * | 1/2011 | F03D 13/20 |
| KR | 101406575 B1 | * | 6/2014 | F03D 7/0204 |
| TW | M364127 U | * | 9/2009 | |
| WO | WO-2009068521 A2 | * | 6/2009 | E02D 27/425 |
| WO | WO-2011101615 A1 | * | 8/2011 | F03D 7/06 |

* cited by examiner

WIND TURBINE WITH A ROTATING TOWER

BACKGROUND OF THE INVENTION

1. Field of the Invention

The present invention relates generally to wind power generation and more specifically to a wind turbine with a rotating tower, which rotates a tower instead of a nacelle to allow a much larger wind turbine to be constructed, or for retrofitting an existing wind turbine.

2. Discussion of the Prior Art

Operation of a wind turbine requires the blades to face a direction of the wind, which requires the wind turbine to have a mechanism for rotating the blades to face the wind.

Traditionally, wind turbines have the capability to rotate the nacelle, located at the top of the tower, by using at least one yaw drive induction motor. Most large capacity wind turbines include a cylindrical tower and an outer diameter, which decreases towards the top of the tower. The cone design is a limiting factor in how much weight or force the tower can support overall, and is a common point of failure when a wind turbine collapses. The use of a conical tower shape is caused by the turbine turning the nacelle and the need for the tower to be aerodynamic regardless of wind direction. The proposed design turns the wind turbine tower and will allow for larger and stronger wind towers in a variety of shapes, including but not limited to oval, elliptical or triangular. For example, using a "symmetrical biconvex" shape (similar to an airfoil) allows for the tower body to have excellent aerodynamic properties while also providing a longer and stronger tower shape to support the nacelle and the plurality of blades. This is made possible, because the entire tower turns in relation to the wind direction and maintains aerodynamic performance.

Another key challenge as wind turbines continue to grow in size is the difficulty of getting parts from the manufacturer to the project site. Tower sections are typically made in ring-like sections but many times the rings may exceed the standard size limits of transportation by road or train. Our proposed idea is to build the tower and base structure(s) in modular, interlocking sections that can easily be transported and assembled on site. The other proposed idea is to build the pieces out of various metals or metal alloys, which can be sourced from recycled materials but also has the potential to be recycled at the end of the parts lifecycle.

Accordingly, there is a clearly felt need in the art for a wind turbine with a rotating tower, which includes a turbine tower with a fixed nacelle and which rotates at a base of the tower, and can be applied to new wind turbines or can be used to retrofit existing wind turbines.

SUMMARY OF THE INVENTION

The present invention provides a wind turbine with a rotating tower, which rotates a tower instead of a nacelle. The wind turbine with a rotating tower (wind turbine rotating tower) preferably includes a stationary base, a rotating tower, a plurality of motor systems, a nacelle and a blade assembly. The stationary base preferably includes a support ring, a support structure and a base bearing. The support structure could be a plurality of equally spaced ring pillars, a solid structure, or any other suitable structure. The support ring includes a peripheral gear rack located on at least an outer perimeter of the support ring. One end of each of the plurality of ring pillars extend from a bottom of the support ring and the other end is in contact with a suitable mounting structure, which is retained in the ground. One end of a plurality of bearing gussets extend from an outer perimeter of the base bearing and an opposing end are secured to the plurality of ring pillars. The support ring, the plurality of ring pillars, the plurality of bearing gussets and the base bearing form a rigid structure.

The rotating tower preferably includes a tower body, a plurality of tower gussets and a bearing shaft. The tower body preferably includes an elongated length and a symmetrical biconvex cross-sectional shape. However, tower body may have any suitable cross-sectional shape, including a round cross-section. The tower body may have any suitable internal structure, which is covered by an outer skin. Each tower gusset preferably includes a triangular shape. Each tower gusset extends outward and downward from the tower body. The bearing shaft extends downward from a pivot point of the tower body at a bottom thereof. The base bearing includes a bearing bore, which is sized to rotatably receive the bearing shaft.

A top of each motor system is attached to a bottom of an opposing end of one tower gusset and one motor system to a bottom of the tower body. Each motor system preferably includes a motor frame, a drive motor unit, at least two upper support rollers, at least four bottom support rollers, at least two left support rollers and at least two right support rollers. The motor frame preferably includes an upper frame member, a left frame member and a right frame member. The left frame member extends downward from a bottom and left side of the upper frame member and the right frame member extends downward from a bottom and right side of the upper frame member. The at least two upper support rollers are rotatably retained in the upper frame member. The at least two left support rollers are rotatably retained in the left frame member. The at least two right support rollers are rotatably retained in the right frame member. Two of the at least four bottom support rollers are rotatably retained on an inside bottom of the left frame member. The other two of the at least four bottom support rollers are rotatably retained on an inside bottom of the right frame member. The plurality of rollers are sized to receive a cross section of the support ring. The drive motor unit includes a motor and at least one drive gear. The motor rotates the at least one drive gear. The at least one drive gear engages the peripheral gear rack. Rotation of the at least one drive gear causes the tower body to rotate relative to the stationary base.

Accordingly, it is an object of the present invention to provide a wind turbine rotating tower, which includes a turbine tower with a fixed nacelle; rotates at a base of the tower; and can be applied to new wind turbines or can be used to retrofit existing wind turbines.

These and additional objects, advantages, features and benefits of the present invention will become apparent from the following specification.

DETAILED DESCRIPTION OF THE PREFERRED EMBODIMENTS

Figure 1:
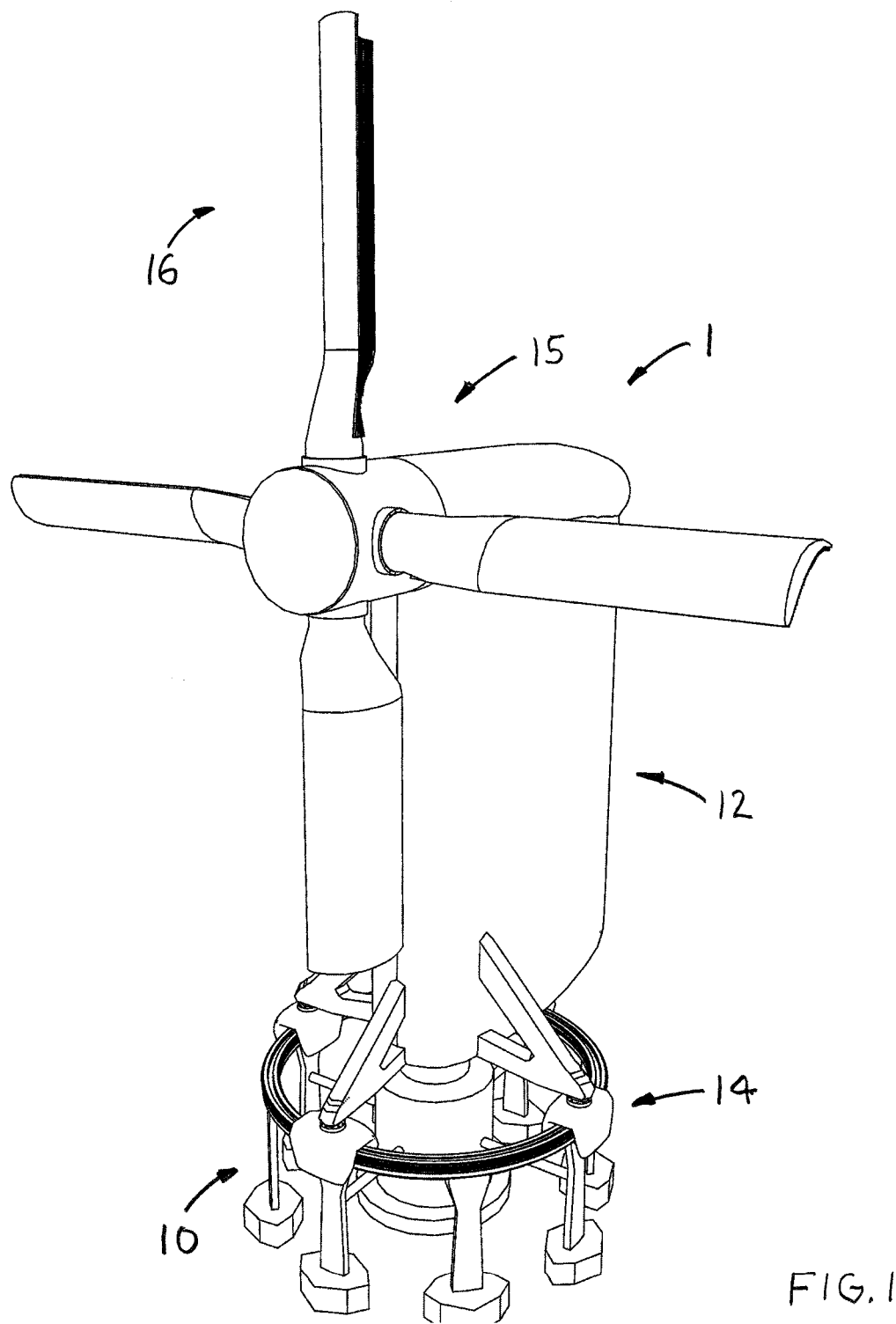
FIG. 1 is a perspective view of a wind turbine rotating tower in accordance with the present invention.
Figure 2:
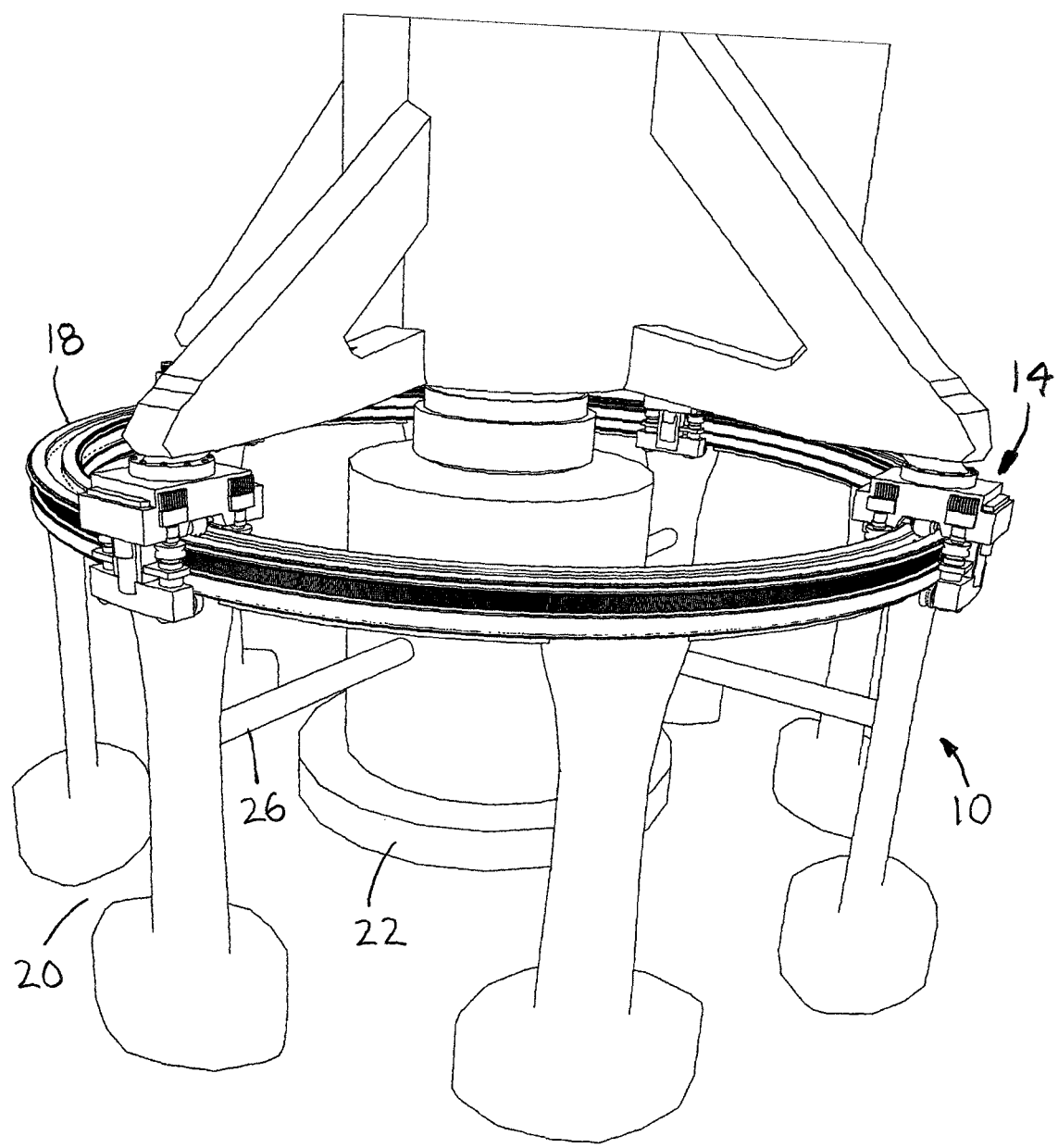
FIG. 2 is an enlarged partial perspective view of a bottom of a wind turbine rotating tower in accordance with the present invention.
Figure 3:
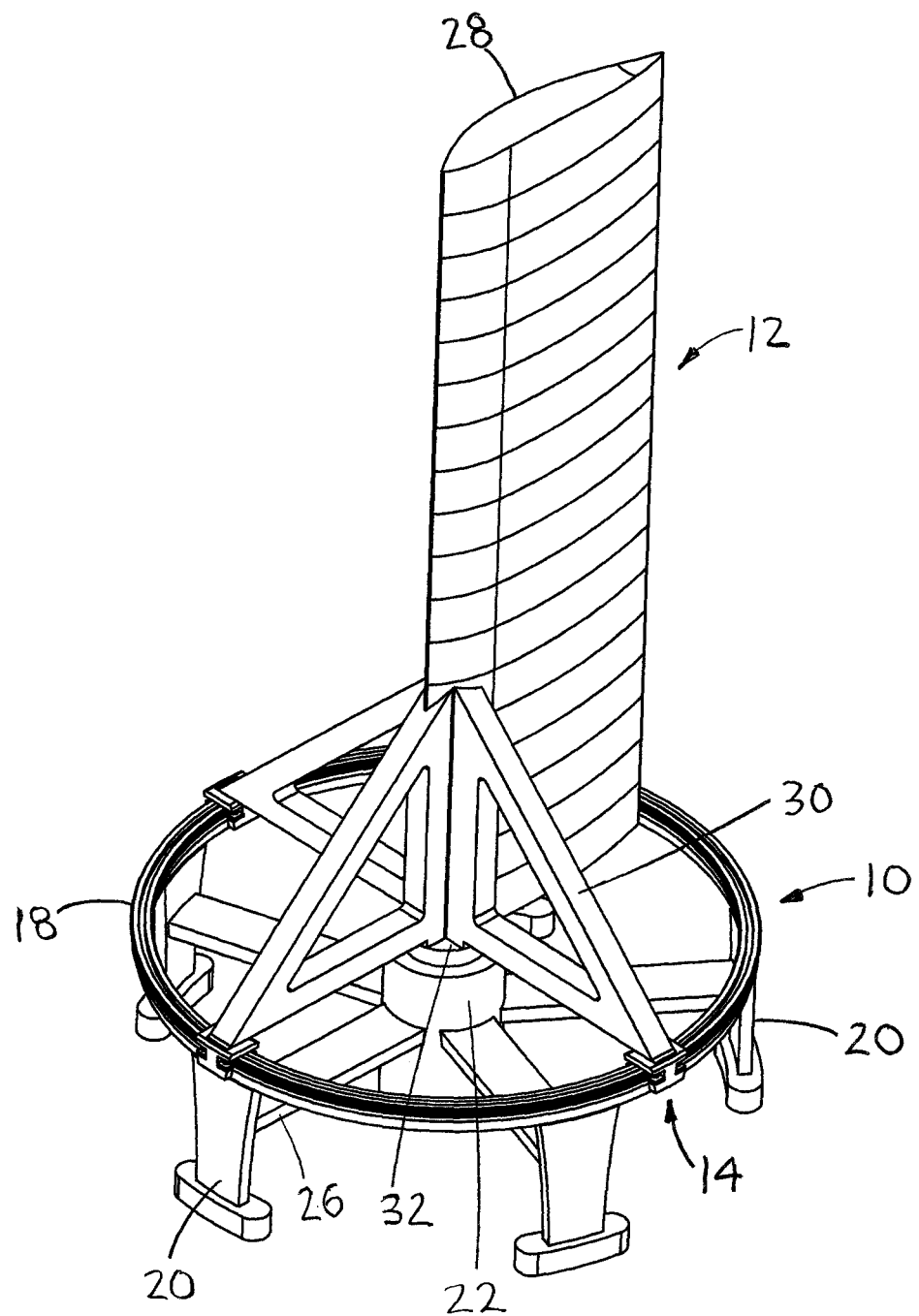
FIG. 3 is a perspective view of a wind turbine rotating tower with a nacelle removed to show a cross section of a rotating tower in accordance with the present invention.
Figure 4:
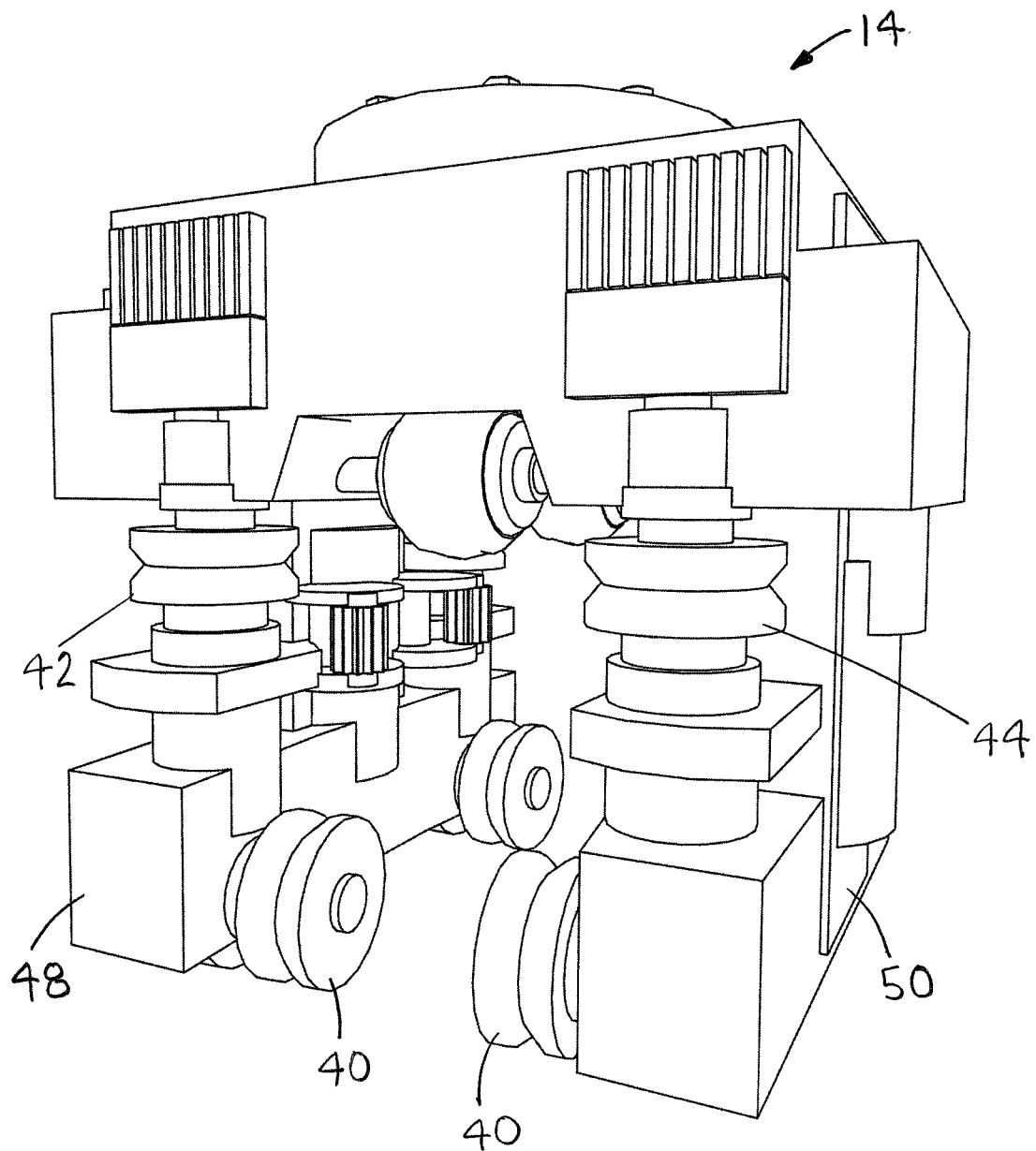
FIG. 4 is a perspective view of a motor system of a wind turbine rotating tower in accordance with the present invention.
Figure 5:
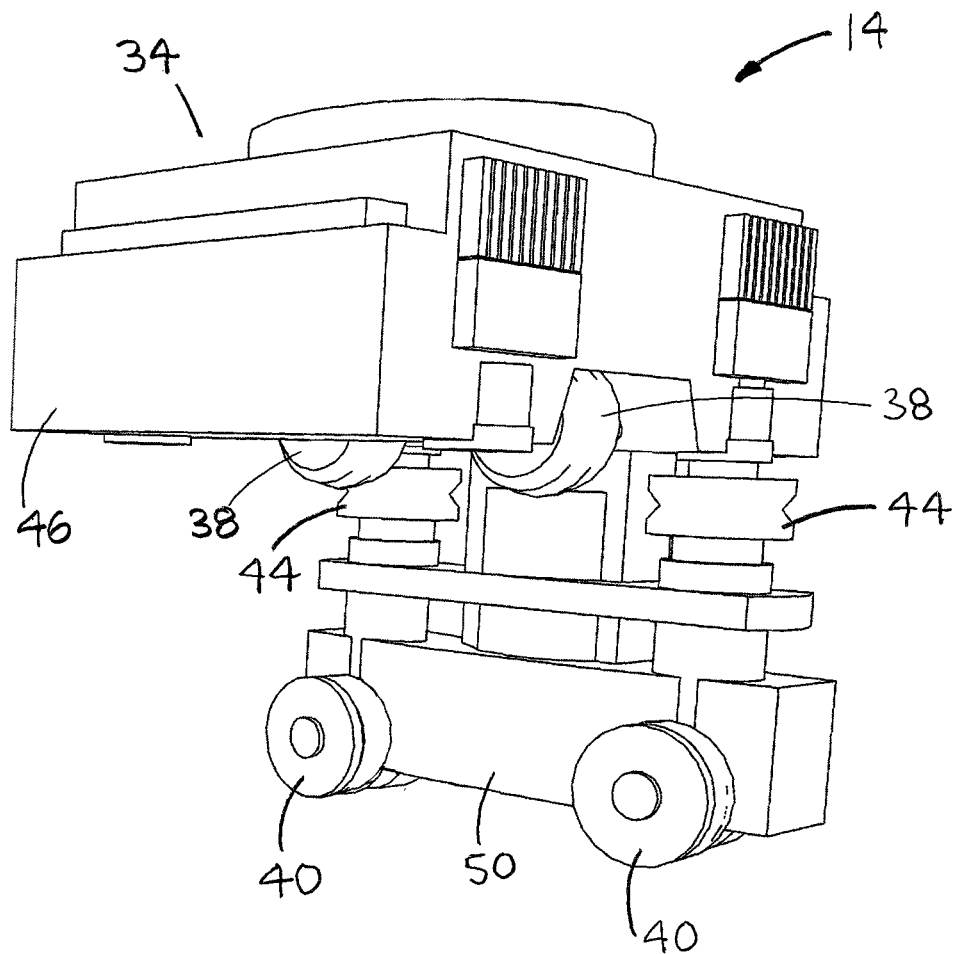
FIG. 5 is a perspective view of a motor system with a left frame member removed of a wind turbine rotating tower in accordance with the present invention.
Figure 6:
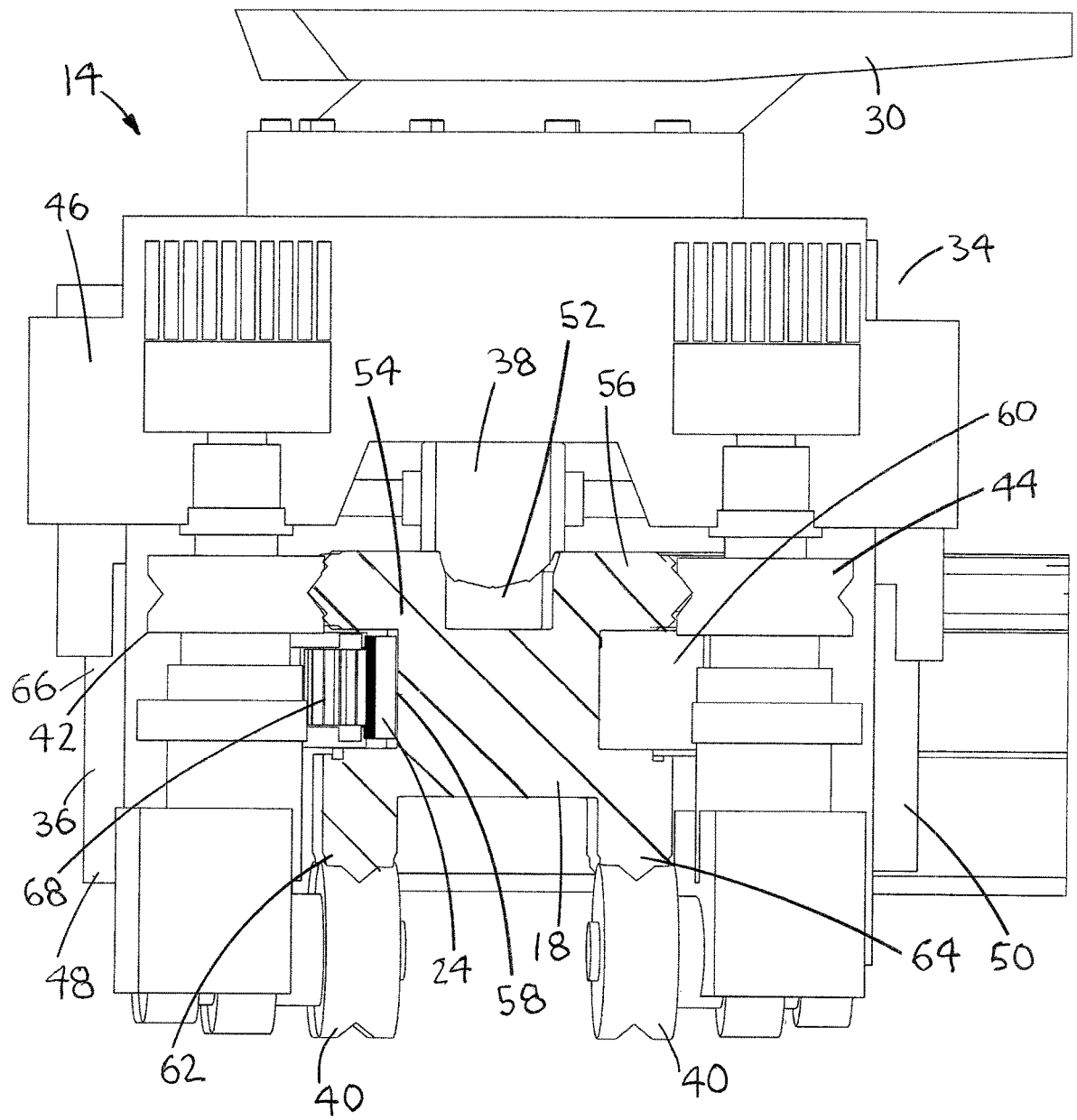
FIG. 6 is an end view of a motor system riding on a support ring and retained by a tower gusset of a wind turbine rotating tower in accordance with the present invention.
Figure 7:
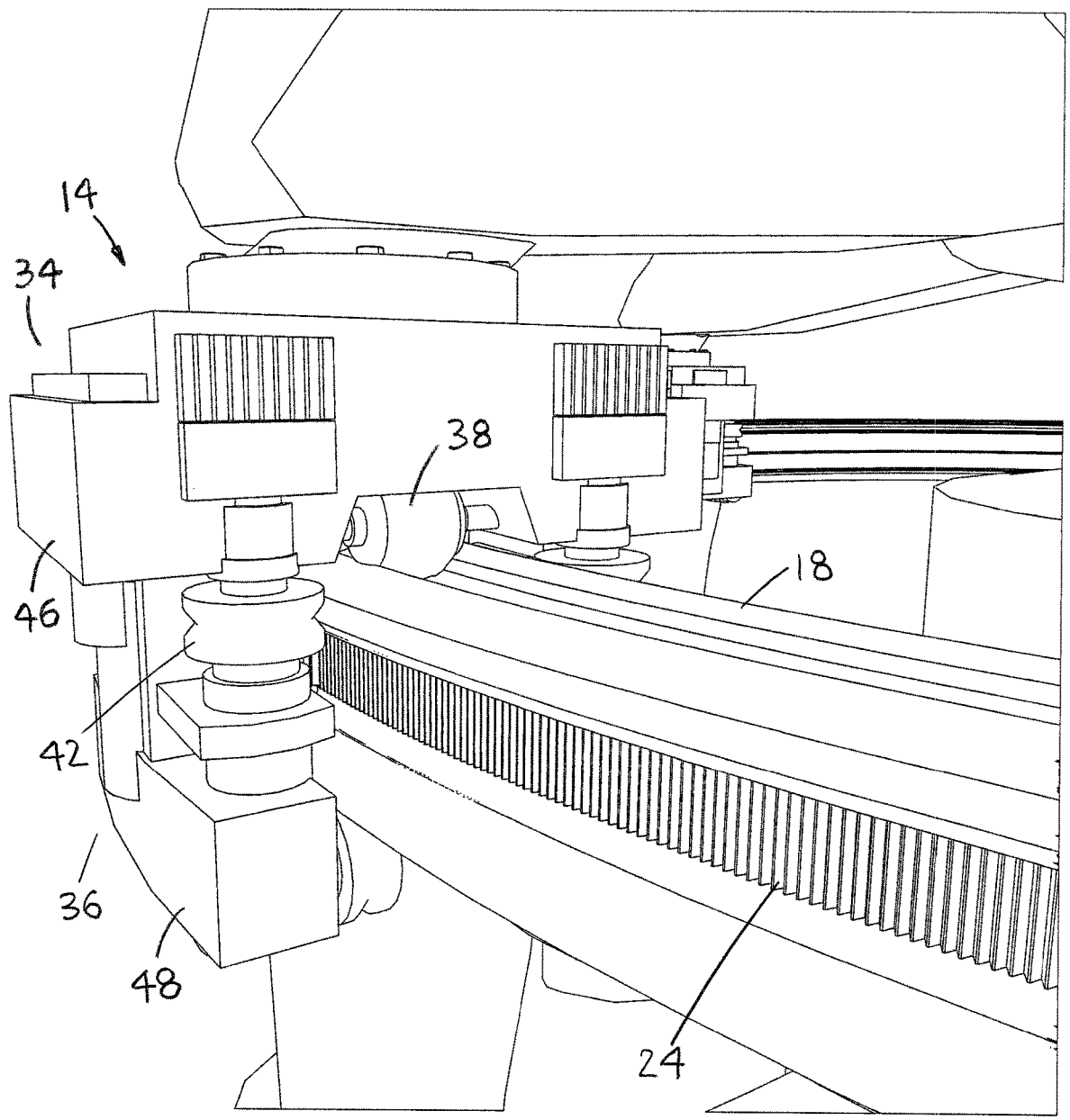
FIG. 7 is a perspective view of a motor system riding on a support ring of a wind turbine rotating tower in accordance with the present invention.

With reference now to the drawings, and particularly to FIG. 1, there is shown a perspective view of a wind turbine rotating tower 1. With reference to FIGS. 2-3, the wind turbine rotating tower 1 preferably includes a stationary base 10, a rotating tower 12, a plurality of motor systems 14, a nacelle 15 and a blade assembly 16. The stationary base 10 preferably includes a support ring 18, a plurality of equally spaced ring pillars 20 and a base bearing 22. With reference to FIGS. 6-7, the support ring 18 preferably includes a peripheral gear rack 24 located on at least an outer perimeter of the support ring 18. One end of each of the plurality of ring pillars 20 extend outward from a bottom of the support ring 18 and the other end is secured to a suitable mounting structure, which is retained in the ground (not shown). One end of a plurality of bearing gussets 26 extend from an outer perimeter of the base bearing 22 and an opposing end are secured to the plurality of ring pillars 20. The support ring 18, the plurality of ring pillars 20, the plurality of bearing gussets 26 and the base bearing 22 form a rigid structure.

The rotating tower 12 preferably includes a tower body 28, a plurality of tower gussets 30 and a bearing shaft 32. The tower body 28 preferably includes an elongated length and a symmetrical biconvex cross-sectional shape. However, other cross-sectional shapes may also be used for the tower body 28, such as a round cross-section. The tower body 28 preferably includes a modular construction, which allows the tower body 28 to be transported to the work site in multiple pieces. The multiple pieces are assembled at the work site. The tower body 28 may have any suitable internal structure, which is covered by an outer skin. Each tower gusset 30 preferably includes a triangular shape. Each tower gusset 30 extends outward and downward from the tower body 28. The bearing shaft 32 extends downward from a pivot point of the tower body 28 and/or a junction of the plurality of tower gussets 30 at a bottom thereof. The base bearing 22 includes a bearing bore, which is sized to rotatably receive the bearing shaft 32.

With reference to FIGS. 4-7, a top of each motor system 14 is attached to a bottom of an opposing end of one tower gusset and a bottom of the tower body 28. Each motor system 14 preferably includes a motor frame 34, a drive motor unit 36, at least two upper support rollers 38, at least four bottom support rollers 40, at least two left support rollers 42 and at least two right support rollers 44. The motor frame 34 preferably includes an upper frame member 46, a left frame member 48 and a right frame member 50. The left frame member 48 extends downward from a bottom and left side of the upper frame member 46 and the right frame member 50 extends downward from a bottom and right side of the upper frame member 46. One type of motor system 14 is shown, but should include any suitable motor system driven by electrical power or the like.

The at least two upper support rollers 38 are rotatably retained in the upper frame member 46. The at least two left support rollers 42 are rotatably retained in the left frame member 48. The at least two right support rollers 44 are rotatably retained in the right frame member 50. Two of the at least four bottom support rollers 40 are rotatably retained on an inside bottom of the left frame member 48. The other two of the at least four bottom support rollers 40 are rotatably retained on an inside bottom of the right frame member 50.

A cross section of the support ring 18 preferably includes a top roller groove 52, a left roller projection 54, a right roller projection 56, a left gear rack groove 58, a right gear rack groove 60, a left bottom roller projection 62 and a right bottom roller projection 64. The at least two upper support rollers 38 are sized to be received by the top roller groove 52. The at least two left support rollers 42 are sized to receive the left roller projection 54. The at least two right support rollers 44 are sized to receive the right roller projection 56. The left gear rack groove 58 is sized to receive the peripheral gear rack 24. Two of the at least four bottom support rollers 40 are sized to receive the left bottom roller projection 62. The other two of the at least four bottom support rollers 40 are sized to receive the right bottom roller projection 64.

The drive motor unit 36 includes a motor 66 and at least one drive gear 68. The motor 66 rotates the at least one drive gear 68. The at least one drive 68 gear engages the peripheral gear rack 24. Rotation of the at least one drive gear 68 causes the rotating tower 12 to rotate relative to the stationary base 10.

While particular embodiments of the invention have been shown and described, it will be obvious to those skilled in the art that
changes and modifications may be made without departing from the invention in its broader aspects, and therefore, the aim in the appended claims is to cover all such changes and modifications as fall within the true spirit and scope of the invention.

The invention claimed is:

1. A rotating tower for a wind turbine, comprising:
a stationary base includes a support ring, a support structure, and a base bearing, said support structure supports said support ring, said base bearing is retained inside of said support structure;
a rotating tower includes a tower body, a plurality of tower gussets, and a bearing shaft, said bearing shaft extends downward from a pivot point of said rotating tower at a bottom thereof, said base bearing includes a bearing bore which is sized to rotatably receive said bearing shaft; and
a plurality of motor systems, each one of said plurality of motor systems includes a drive motor unit and a plurality of support rollers, one of said plurality of motor systems is attached to a bottom of one said plurality of tower gussets, wherein said plurality of support rollers engage a cross-section of said support ring, an output of said drive motor unit causes said rotating airflow tower to rotate relative to said stationary base.

2. The rotating tower for a wind turbine of claim 1, wherein:
a cross section of said tower body includes a symmetrical biconvex shape.

3. The rotating tower for a wind turbine of claim 1, wherein:
a cross section of said support ring includes a top roller groove, a left roller projection, a right roller projection, a gear rack groove, a left bottom roller projection and a right bottom roller projection.

4. The rotating tower for a wind turbine of claim 3, wherein:
said plurality of support rollers include at least two upper support rollers which are sized to be received by said top roller groove, at least two left support rollers are sized to receive said left roller projection, at least two right support rollers are sized to receive said right roller projection, at least four bottom support rollers, two of said at least four bottom support rollers are sized to receive said left bottom roller projection, the other two of said at least four bottom support rollers are sized to receive said right bottom roller projection.

5. The rotating tower for a wind turbine of claim 1, wherein:
said plurality of motor systems are attached to said plurality of tower gussets.

6. The rotating tower for a wind turbine of claim 1, wherein:
each one of said plurality of tower gussets includes a triangular shape.

7. A rotating tower for a wind turbine, comprising:
a stationary base includes a support ring, a support structure and a base bearing, said support structure supports said support ring, said base bearing is retained inside of said support structure, said support ring includes a peripheral gear rack;
a rotating tower includes a tower body, a plurality of tower gussets and a bearing shaft, each one of said plurality of tower gusset extends outward and downward from said tower body, said bearing shaft extends downward from a pivot point of said rotating tower body at a bottom thereof, said base bearing includes a bearing bore which is sized to rotatably receive said bearing shaft; and
a plurality of motor systems, each one of said plurality of motor systems includes a drive motor unit and a plurality of support rollers, one of said plurality of motor systems is attached to a bottom of one said plurality of tower gussets, wherein said plurality of support rollers engage a cross-section of said support ring, at least one drive gear of said drive motor engages said peripheral drive rack and causes said rotating airflow tower to rotate relative to said stationary base.

8. The rotating tower for a wind turbine of claim 7, wherein:
a cross section of said tower body includes a symmetrical biconvex shape.

9. The rotating tower for a wind turbine of claim 7, wherein:
a cross section of said support ring includes a top roller groove, a left roller projection, a right roller projection, a gear rack groove, a left bottom roller projection and a right bottom roller projection.

10. The rotating tower for a wind turbine of claim 9, wherein:
said plurality of support rollers include at least two upper support rollers which are sized to be received by said top roller groove, at least two left support rollers are sized to receive said left roller projection, at least two right support rollers are sized to receive said right roller projection, at least four bottom support rollers, two of said at least four bottom support rollers are sized to receive said left bottom roller projection, the other two of said at least four bottom support rollers are sized to receive said right bottom roller projection.

11. The rotating tower for a wind turbine of claim 7, wherein:
said plurality of motor systems are attached to a said plurality of tower gussets.

12. The rotating tower for a wind turbine of claim 7, wherein:
each one of said plurality of tower gussets includes a triangular shape.

13. A rotating tower for a wind turbine, comprising:
a stationary base includes a support ring, a plurality of ring pillars and a base bearing, said plurality of ring pillars supports said support ring, said base bearing is secured to said support structure with a plurality of bearing gussets, said support ring includes a peripheral gear rack;
a rotating tower includes a tower body, a plurality of tower gussets and a bearing shaft, each one of said plurality of tower gusset extends outward and downward from said tower body, said bearing shaft extends downward from a pivot point of said tower body at a bottom thereof, said base bearing includes a bearing bore which is sized to rotatably receive said bearing shaft; and
a plurality of motor systems, each one of said plurality of motor systems includes a drive motor unit and a plurality of support rollers, one of said plurality of motor systems is attached to a bottom of one said plurality of tower gussets, wherein said plurality of support rollers engage a cross-section of said support ring, at least one drive gear of said drive motor engages said peripheral drive rack and causes said rotating airflow tower to rotate relative to said stationary base.

14. The rotating tower for a wind turbine of claim 13, wherein:
a cross section of said tower body includes a symmetrical biconvex shape.

15. The rotating tower for a wind turbine of claim 13, wherein:
a cross section of said support ring includes a top roller groove, a left roller projection, a right roller projection, a gear rack groove, a left bottom roller projection and a right bottom roller projection.

16. The rotating tower for a wind turbine of claim 15, wherein:
said plurality of support rollers include at least two upper support rollers which are sized to be received by said top roller groove, at least two left support rollers are sized to receive said left roller projection, at least two right support rollers are sized to receive said right roller projection, at least four bottom support rollers, two of said at least four bottom support rollers are sized to receive said left bottom roller projection, the other two of said at least four bottom support rollers are sized to receive said right bottom roller prolection.

17. The rotating tower for a wind turbine of claim 13, wherein:
said plurality of motor systems are attached to said plurality of tower gussets.

18. The rotating tower for a wind turbine of claim 13, wherein:

each one of said plurality of tower gussets includes a triangular shape.

* * * * *